(12) United States Patent
Lovett et al.

(10) Patent No.: US 9,424,700 B2
(45) Date of Patent: Aug. 23, 2016

(54) ELECTRONIC LOCK HAVING USAGE AND WEAR LEVELING OF A TOUCH SURFACE THROUGH RANDOMIZED CODE ENTRY

(71) Applicant: KWIKSET CORPORATION, Lake Forest, CA (US)

(72) Inventors: Matthew Lovett, Mission Viego, CA (US); Timothy Brewer, San Diego, CA (US); Elliott B. Schneider, Foothill Ranch, CA (US); Michael Magnani, Costa Mesa, CA (US)

(73) Assignee: Spectrum Brands, Inc., Middleton, WI (US)

( * ) Notice: Subject to any disclaimer, the term of this patent is extended or adjusted under 35 U.S.C. 154(b) by 13 days.

(21) Appl. No.: 14/520,979

(22) Filed: Oct. 22, 2014

(65) Prior Publication Data
US 2015/0279136 A1    Oct. 1, 2015

Related U.S. Application Data

(60) Provisional application No. 61/970,127, filed on Mar. 25, 2014.

(51) Int. Cl.
| | |
|---|---|
| *G08B 21/00* | (2006.01) |
| *G07C 9/00* | (2006.01) |
| *G06F 3/041* | (2006.01) |
| *E05B 47/00* | (2006.01) |
| *E05C 1/08* | (2006.01) |
| *G06F 3/0488* | (2013.01) |

(52) U.S. Cl.
CPC ............ *G07C 9/00174* (2013.01); *E05B 47/00* (2013.01); *E05C 1/08* (2013.01); *G06F 3/0416* (2013.01); *G06F 3/04886* (2013.01); *G07C 9/00126* (2013.01); *G07C 9/0069* (2013.01); *G07C 2209/65* (2013.01); *Y10T 70/7068* (2015.04)

(58) Field of Classification Search
None
See application file for complete search history.

(56) References Cited

U.S. PATENT DOCUMENTS

| | | | |
|---|---|---|---|
| 5,873,276 A * | 2/1999 | Dawson | G07C 9/00912 340/5.54 |
| 6,434,702 B1 | 8/2002 | Maddalozzo, Jr. et al. | |
| 7,992,007 B2 | 8/2011 | Lazzaro et al. | |
| 2006/0238294 A1* | 10/2006 | Gokcebay | E05B 47/06 340/5.54 |
| 2008/0127686 A1 | 6/2008 | Hwang | |
| 2011/0162420 A1 | 7/2011 | Lee | |

(Continued)

FOREIGN PATENT DOCUMENTS

| | | |
|---|---|---|
| KR | 2009-0041743 A | 4/2009 |
| KR | 20090041743 A * | 4/2009 |

(Continued)

OTHER PUBLICATIONS

PCT International Search Report; May 11, 2015.

*Primary Examiner* — Travis Hunnings
(74) *Attorney, Agent, or Firm* — Barnes & Thornburg LLP

(57) ABSTRACT

An electronic lock that requires the user complete a wear leveling action prior to entering in the passcode. The wear leveling action causes the user to touch one or more portions of the touch interface that may not be associated with the passcode to distribute wear of the touch interface. These area(s) of the touch interface selected for the wear leveling actions could be determined based on a pseudorandom number generator and/or by tracking usage of the touch interface to identify less used areas.

28 Claims, 8 Drawing Sheets

(56) References Cited

U.S. PATENT DOCUMENTS

| | | | |
|---|---|---|---|
| 2011/0174200 A1* | 7/2011 | Bartel | E05G 1/00 109/59 T |
| 2013/0050106 A1 | 2/2013 | Chung et al. | |
| 2013/0141353 A1 | 6/2013 | Chang | |
| 2013/0229367 A1 | 9/2013 | Pinch | |
| 2013/0234971 A1 | 9/2013 | Li | |
| 2013/0321297 A1 | 12/2013 | Li | |

FOREIGN PATENT DOCUMENTS

| | | | |
|---|---|---|---|
| KR | 2009-0043091 A | | 5/2009 |
| KR | 20090043091 A | * | 5/2009 |
| KR | 2010-0020559 A | | 2/2010 |

\* cited by examiner

ELECTRONIC LOCK HAVING USAGE AND WEAR LEVELING OF A TOUCH SURFACE THROUGH RANDOMIZED CODE ENTRY

RELATED APPLICATION

This application claims the benefit of U.S. Provisional Application Ser. No. 61/970,127, filed Mar. 25, 2014, entitled "Electronic Lock Having Usage and Wear Leveling of a Touch Surface through Randomized Code Entry" which is hereby incorporated by reference in its entirety.

TECHNICAL FIELD

The present invention relates generally to electronic locks, and, more particularly, to an electronic lock having usage and wear leveling of a touch surface through randomized code entry.

BACKGROUND AND SUMMARY

Electronic locks are well known. To unlock certain types of electronic locks, the user must enter a valid passcode into the lock using a touch surface. After extended use of the touch surface, however, the oils and dirt on users' finger tips can leave smudges and cause abrasions on the most heavily used areas. As this wear builds, the areas most used become visibly distinguishable from lesser used areas. This creates a potential security risk because a person attempting to guess the passcode now only has to figure out the order of the keys that have been worn down. Accordingly, there is a need for an electronic lock that reduces visible wear areas on the touch surface used to enter a passcode.

According to one aspect, this disclosure provides an electronic lock that requires the user complete a wear leveling action prior to entering in the passcode. The wear leveling action causes the user to touch portions of the touch interface that may not be associated with the passcode to distribute wear of the touch interface. For example, the user could be required to touch multiple areas of the touch interface prior to entering the passcode. These areas of the touch interface selected for the wear leveling actions could be determined based on a pseudorandom number generator and/or by tracking usage of the touch interface to identify less used areas.

In some embodiments, at start of a wear leveling interaction, a single area of the interface may be illuminated. If the users touches this area (with the possibility of a time limit) illumination would cease and a second area (may be same as first area) of the interface would illuminate. On touch of the second area (or more than two areas), the wear leveling interaction would be complete.

Embodiments are contemplated in which the wear leveling action could be based on touching a row or column of keys that are illuminated. For example, the lock could illuminate 3 areas of the touch interface that fall in line with each other and have the user touch all 3 areas in succession. In some cases, directionality would not matter, but only that the user starts at an endpoint of the line and not the midpoint. Typically, the user may lift their finger in between presses.

In another embodiment, the wear leveling action could require the user to touch and hold one or more keys. For example, the lock could illuminate 1 area of the touch interface user must touch and hold until entire touch interface illuminates, which indicates the wear leveling action is complete. By way of another example, the lock could illuminate two adjacent areas of the touch interface and user must touch and hold both areas until the entire touch interface illuminates.

Accordingly to a further aspect, this disclosure provides a method of leveling wear on a touch surface for an electronic lock. One or more portions of a touch interface of an electronic lock that need to be selected to complete a wear leveling action are determined. These portion(s) are visually indicating on the touch interface. Upon selection of the areas of the touch interface that need to be selected to complete the wear leveling action, there is a visual and/or audible indication that the wear leveling action has been completed. In some embodiments, the determination of the one or more portions of a touch interface that need to be selected to complete the wear leveling action is made, at least in part, using a pseudo-random generator. Embodiments are contemplated in which the determination of the one or more portions of a touch interface that need to be selected to complete the wear leveling action is made, at least in part, using the wear usage of the touch interface.

Additional features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE DRAWINGS

Figure 1A:
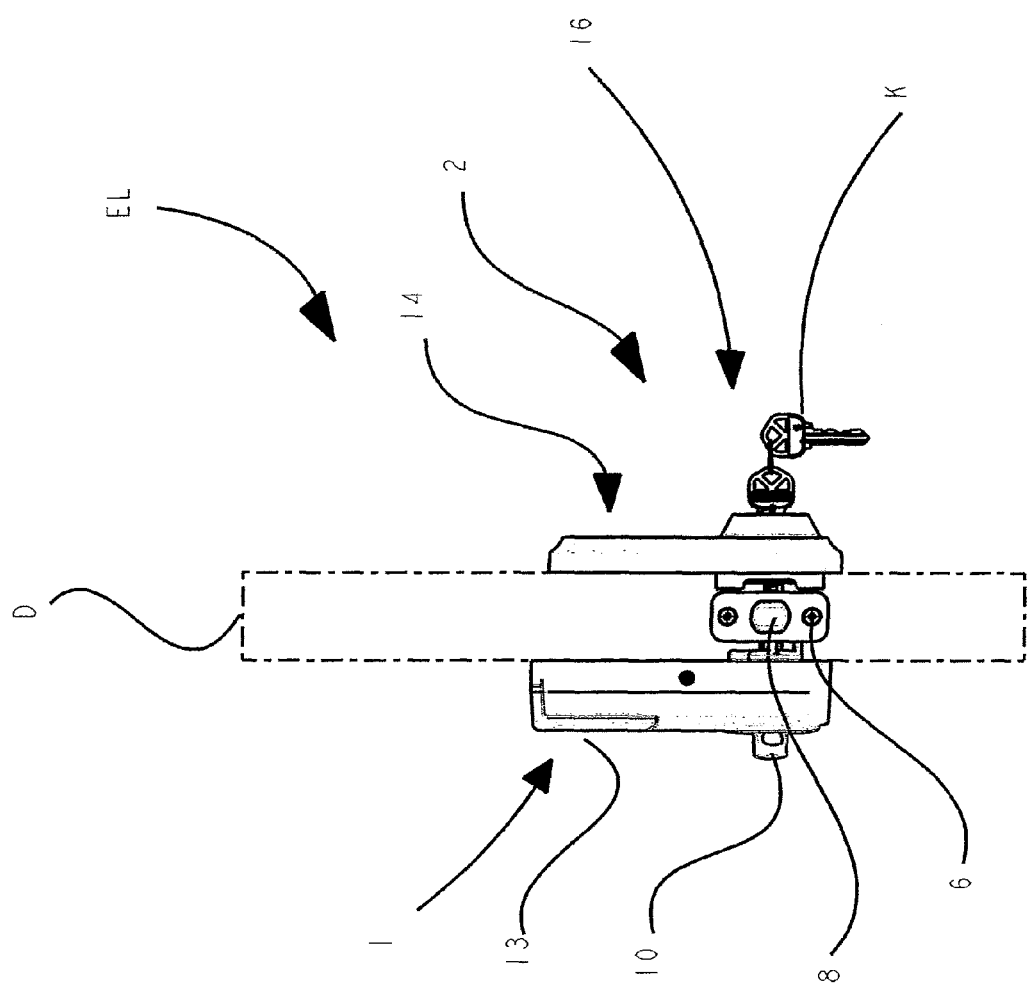
FIG. 1A is a side view of an electronic lock in accordance with an embodiment of the present invention, installed on a door and with the door show in phantom lines.
Figure 1B:
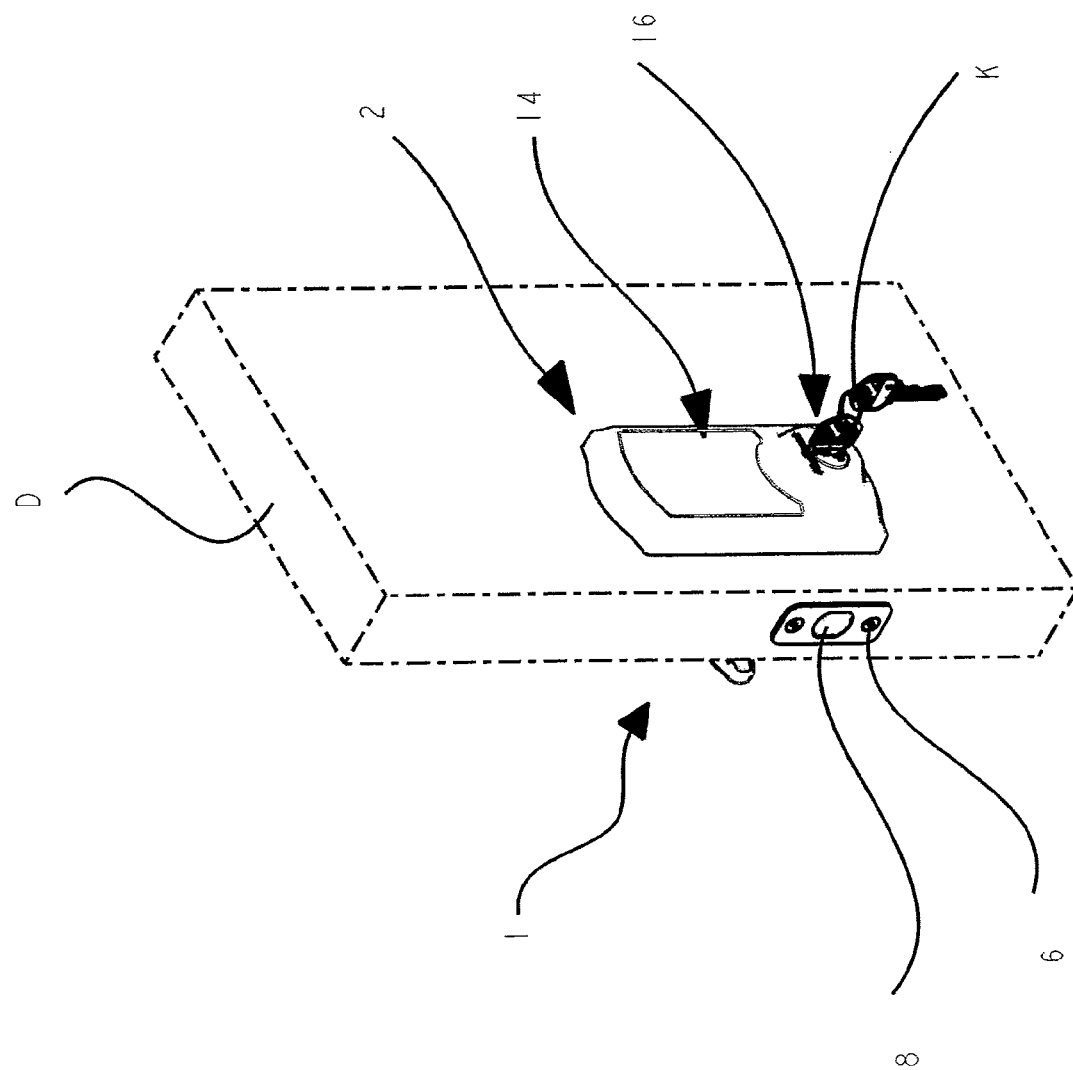
FIG. 1B is a perspective view of the electronic lock of FIG. 1A, as viewed from the exterior of the door.
Figure 1C:
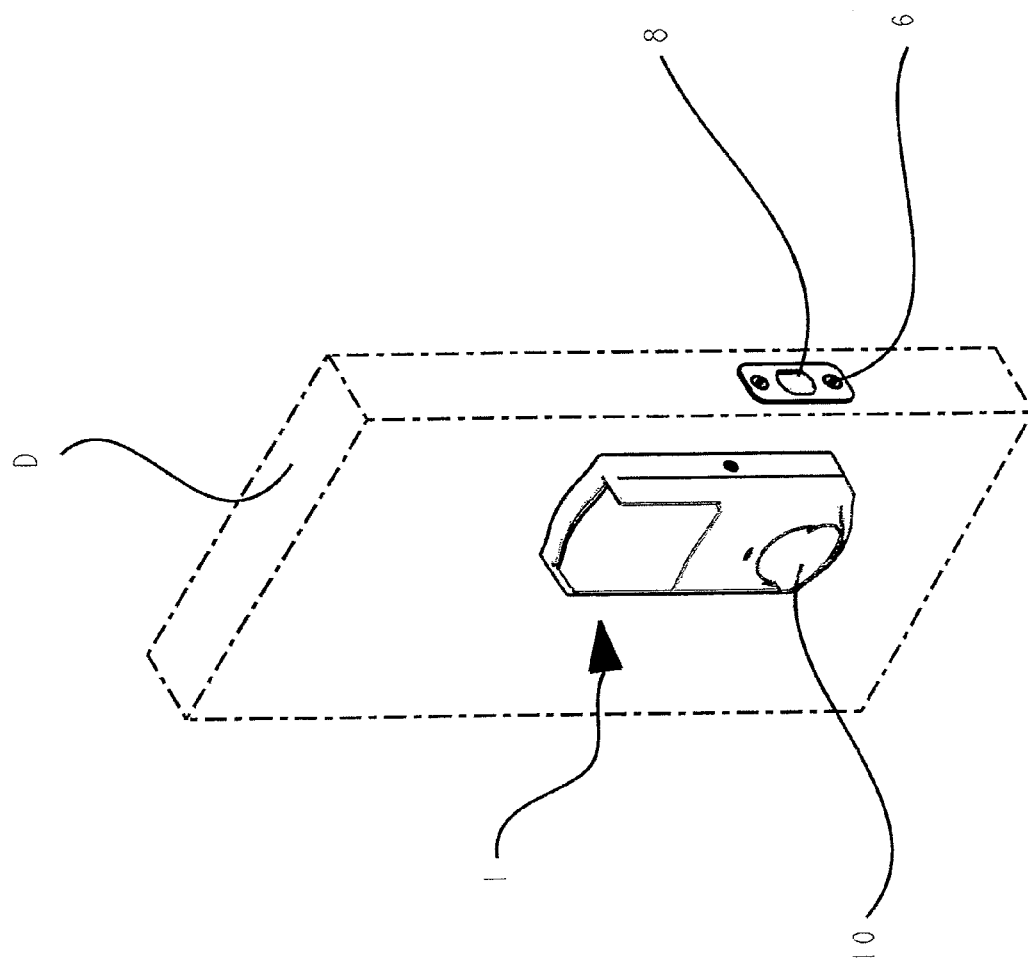
FIG. 1C is a perspective view of the electronic lock of FIG. 1A as viewed from the interior of the door.

Referring now to the drawings and particularly to FIGS. 1A-1C and 2, there is shown an electronic lock (EL) in accordance with an embodiment of the present disclosure for mounting on a door D, and which includes an interior chassis 1, an exterior chassis 2, a mounting plate 3, an adapter 4, a latch assembly 5, and a strike 6.

Figure 2:
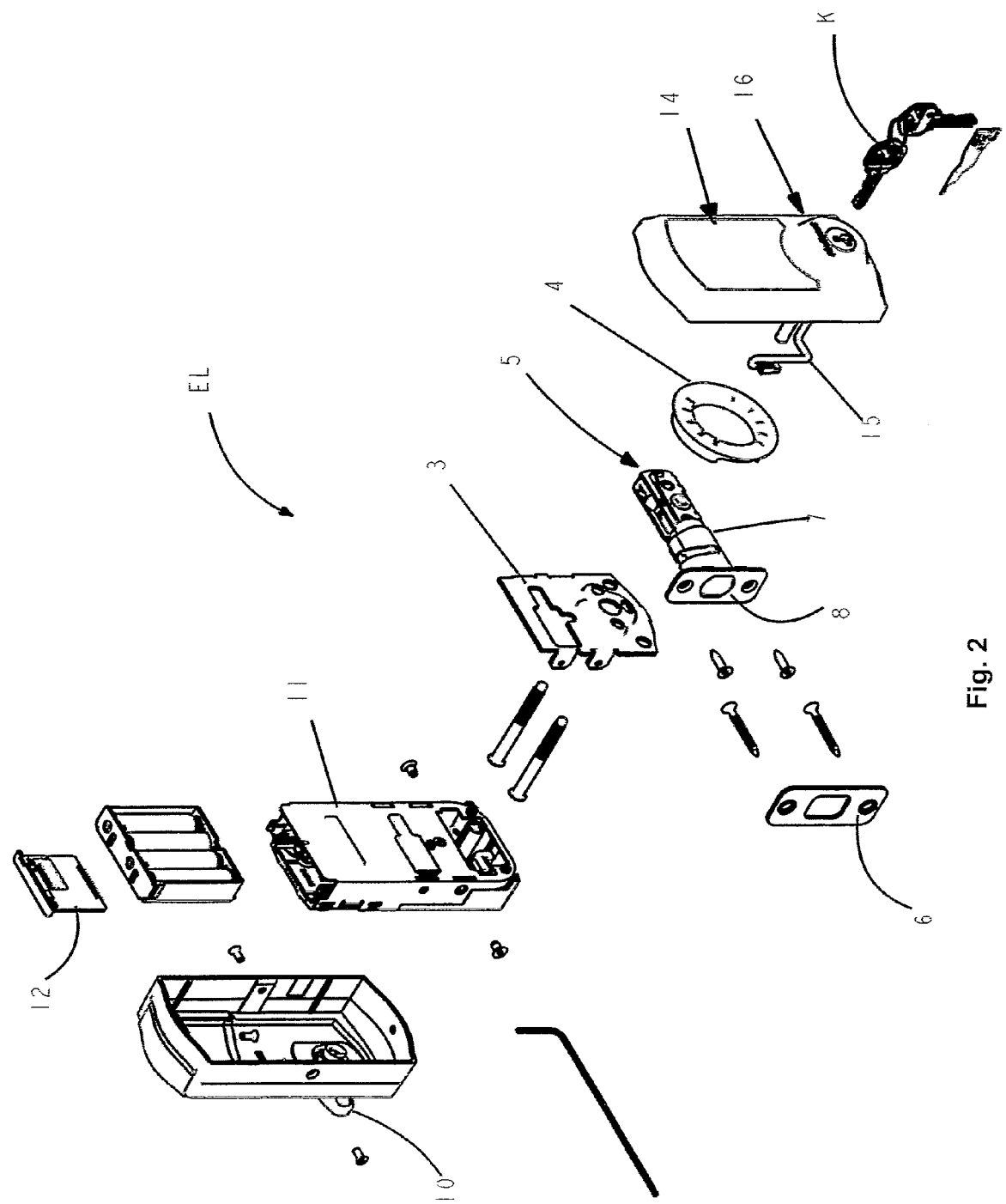
FIG. 2 is an exploded view of the electronic lock of FIGS. 1A-1C.

As shown in FIG. 2, latch assembly 5 is of a configuration well known in the art, and includes a bolt actuator mechanism 7, and a bolt 8. Mounting plate 3 is used to mount the electronic lock to the door D. Adapter 4 is used to adapt the electronic lock to a particular hole opening in the door D. Although a deadbolt is shown for purposes of example, the wear leveling described herein is also applicable to other types of locks with a touch interface, including electronic levers.

Figure 3:
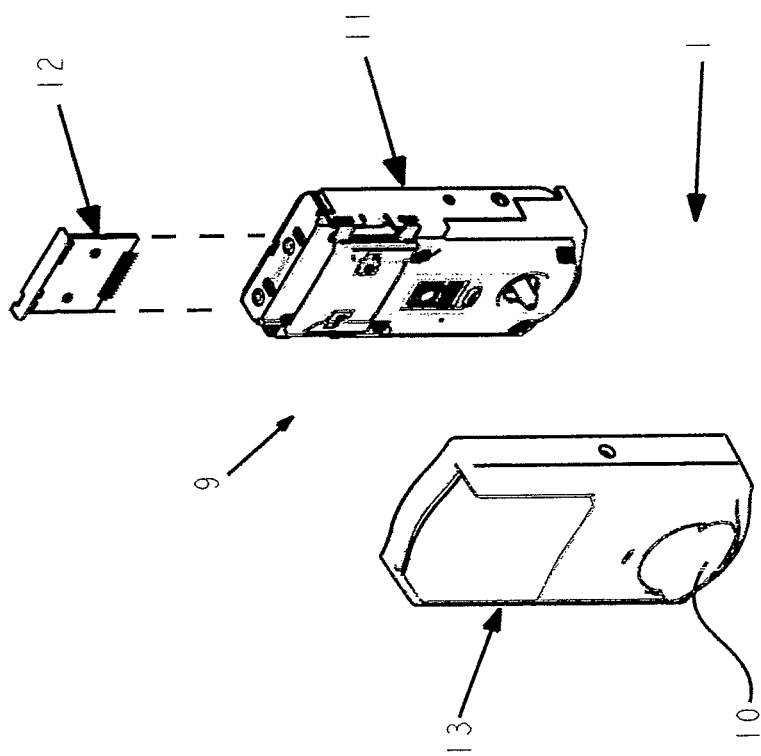
FIG. 3 is a perspective view of the interior chassis of the electronic lock of FIG. 2, with the upper cover and daughter card removed.

Referring also to FIG. 3, interior chassis 1 includes the electronics circuitry 9 for the electronic lock, and further includes a manual turnpiece 10. Manual turnpiece 10 is used on the interior side of door D to operate the bolt actuator mechanism 7 of latch assembly 5, and in turn to extend and retract bolt 8 (see also FIG. 1C). In this example, the electronics circuitry 9 includes a base board 11 and an optional daughter card 12. In FIG. 3, a removable cover 13 is provided to cover over the base board 11 and daughter card 12, when cover 13 is in the installed position. The optional daughter card 12 is a wireless communications module that facilitates wireless communications with an external device though a desired wireless communications protocol, e.g., Zigbee, Z-wave, etc.

Referring again to FIG. 2, exterior chassis 2 includes a touch interface 14, such as a touch screen or a touch keypad, for receiving a user input. The difference between a touch screen and a touch keypad is that a touch screen has a display of some sort, usually but not limited to a LCD; smart phones are a prime example of a touch screen. Touch keypads, display a static image, by lighting the backside of a painted surface; a car's instrument panel is a good example of this lighting. Both touch screens and touch keypads are able detect a user's "press of a button" by contact without the need for pressure or mechanical actuation. This disclosure is directed to wear leveling techniques applicable to both touch screens and touch keyboards used as the touch interface 14.

Touch interface 14 is electrically connected to the base board 11 of electronics circuitry 9, such as for example by an electrical cable 15. When the user inputs a valid passcode via touch interface 14 that is recognized by the electronics circuitry 9, an electrical motor (not show) is energized to retract the bolt 8 of latch assembly 5, thus permitting door D (see FIG. 1B) to be opened from a closed position. Alternatively, a key actuator 16, having a removable key K, is provided for manually operating latch assembly 5 from the exterior of the door D.

Prior to entering a passcode via the touch interface, however, the electronic circuitry 9 is configured to initiate a wear leveling action, as described in more detail below, which is intended to distribute usage of the touch interface 14 over substantially the entire touch surface. As mentioned above, oils and dirt on users' finger tips can leave smudges and usage over time can cause abrasions and scratches on the most heavily used areas of the touch surface. As this wear builds, the areas most used become visibly distinguishable from lesser used areas. This creates a potential security risk because a person attempting to guess the passcode would only need to figure out the order of the keys corresponding with the worn areas.

Figure 4:
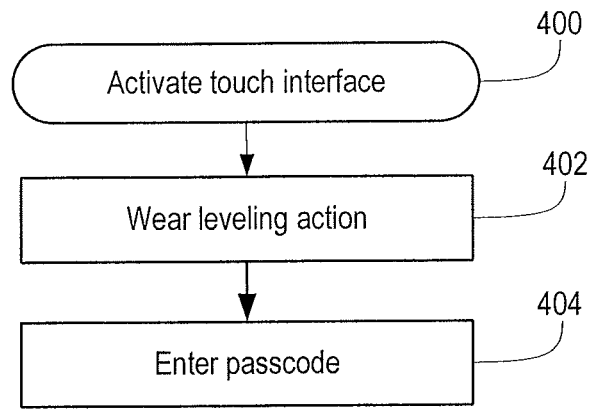
FIG. 4 is a flow chart showing an example method by which a wear leveling action could be used.

FIG. 4 shows examples steps that could be used by the electronics circuitry 9 to even out wear of areas corresponding with the user's passcode with other areas of the touch interface 14. In many cases, the touch interface 14 is activated or "woken up" by the user prior to entry of a passcode (block 400). For example, the EL could include a button for activating the touch interface 14. Alternatively, an area of the touch interface 14 could be used to activate the touch interface 14. Upon activation of the touch interface 14, the user would be required to perform a wear leveling action prior to entering the passcode (block 402). For example, the wear leveling action could require the user to touch one or more areas of the touch surface without regard to the passcode. For example, the electronics circuitry 9 could include a PRNG (e.g., pseudorandom number generator) to determine which areas of the touch interface 14 to illuminate. By way of another example, user interactions with the interface could be tracked and less used areas of the touch interface 14 could be selected for wear leveling. In some cases, a combination of the PRNG and/or usage tracking of the touch interface 14 could be used. Once the wear leveling action has been performed, the user may then enter a passcode to unlock the EL (block 404).

Figure 5:
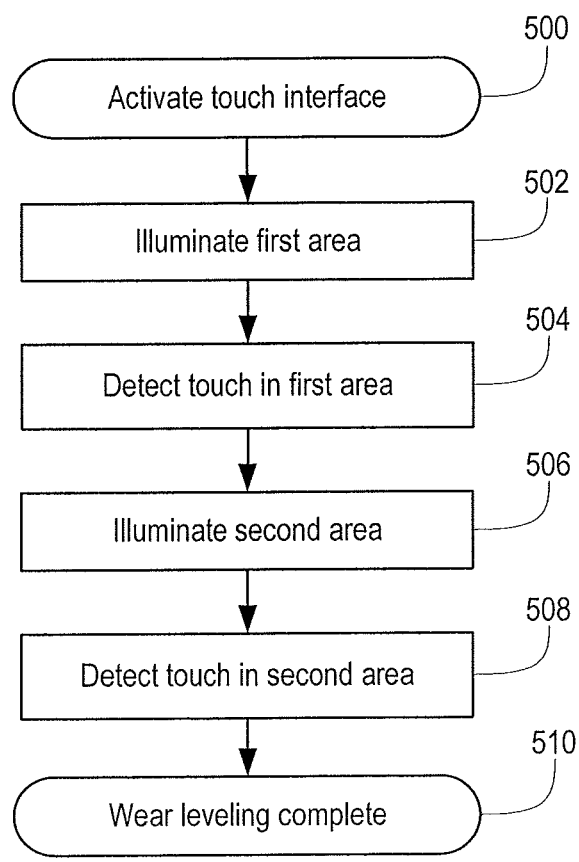
FIG. 5 is a flow chart showing an example method of using a wear leveling action according to an embodiment.

FIG. 5 shows steps of an example wear leveling action that could be performed by electronics circuitry 9 according to an embodiment of this disclosure. In this example, the user must sequentially select multiple areas of touch interface 14 as a wear leveling action. Upon activating the touch interface (block 500), for example, the electronics circuitry 9 could illuminate one of the areas of the touch interface corresponding to a key (block 502). In this example, the user would be required to touch the illuminated area. Upon detection of the user touching the first illuminated area (block 504), the electronics circuitry 9 would then illuminate a second area (block 506). The user would then be required to touch the second illuminated area. Upon detecting that the second illuminated area has been touched (block 508), the wear leveling is complete (block 510) and the user can then enter a passcode to unlock the EL. For example, the electronics circuitry 9 could indicate the wear leveling action is complete by illuminating all areas of the touch interface 14. Although in this example two illuminated areas were used for wear leveling, one skilled in the art should appreciate this is merely for purposes of example. Additional areas could be sequentially illuminated and touched by the user prior to ending the wear leveling action depending on the circumstances.

Consider an example with this embodiment in which the user activates the touch interface 14 by pressing a button. In this example, the electronics circuitry 9 illuminates the area corresponding to the "1" key based on a pseudorandom generator and/or usage tracking. Upon the user touching the area of touch interface 14 corresponding with the "1" key, the electronics circuitry 9 illuminates the area corresponding with the "7" key based on the pseudorandom generator and/or usage tracking. Upon the user touching the area of touch interface 14 corresponding with the "7" key, the electronics circuitry 9 illuminates the area corresponding with the "9" key based on the pseudorandom generator and/or usage tracking. Upon detecting the user touching the area corresponding with the "9" key, the electronics circuitry 9 could illuminate all areas of the touch interface 14 to indicate the user may now enter the passcode.

Figure 6:
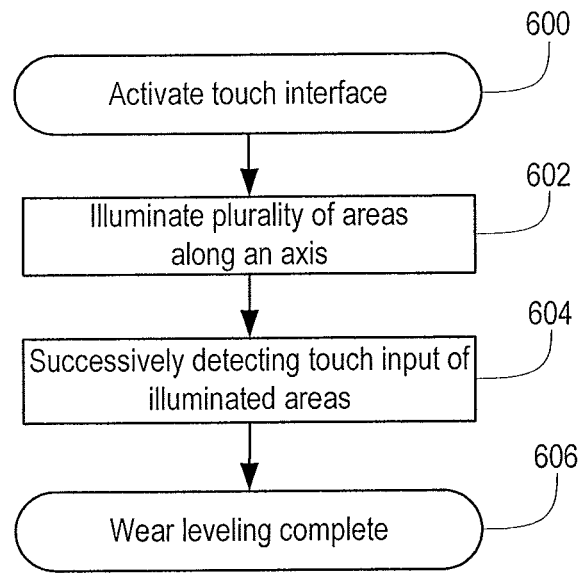
FIG. 6 is a flow chart showing an example method of using a wear leveling action according to an embodiment.

FIG. 6 shows steps of an example wear leveling action that could be performed by electronics circuitry 9 according to another embodiment of this disclosure. In this example, the electronics circuitry 9 illuminates areas that are arranged in line along the same axis and user must select the areas prior to entering the passcode. Upon activating the touch interface (block 600), for example, the electronics circuitry 9 could illuminate three areas of the touch interface corresponding to threes keys arranged in a line, which could be either a row or column of keys (block 602). The electronics circuitry 9 could use a pseudorandom generator and/or usage tracking to determine which row or column of keys in the touch interface 14 to illuminate. The user may then select the illuminated areas prior to entering the passcode (block 604). In some embodiments, the directionality of the user selecting areas (e.g., keys) would not matter, only that the user starts at an end point of the line and not the midpoint. Upon detecting that the illuminated areas have been successively touched, the wear leveling is complete (block 606) and the user can then enter a passcode to unlock the EL.

Figure 8C:
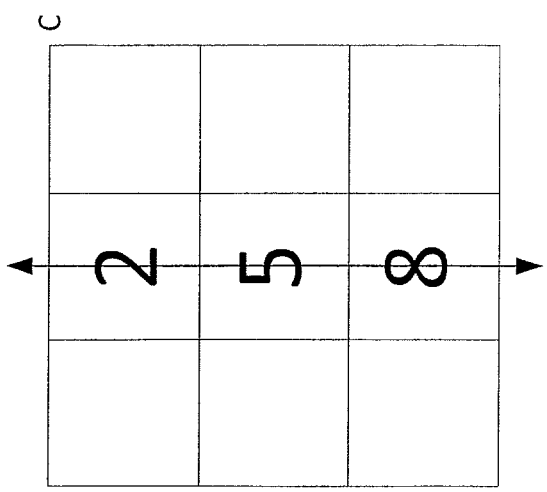
FIGS. 8A-8C show an example touch interface with various areas illuminated based on example wear leveling methods.
Figure 8B:
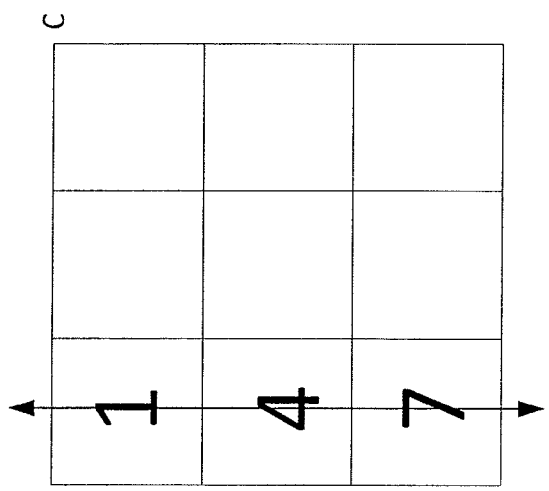
Figure 8A:
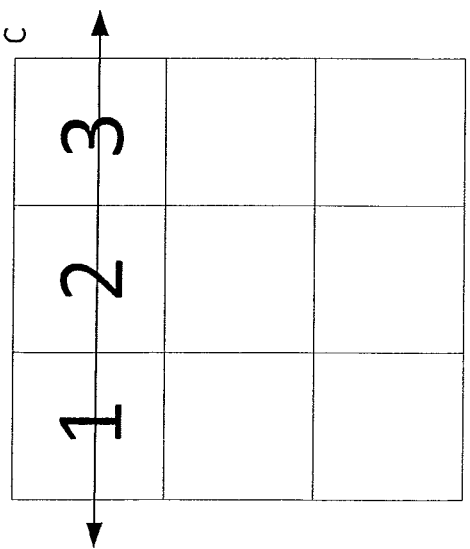

Consider an example with this embodiment in which the user activates the touch interface 14 by pressing a button. In this example, shown in FIG. 8A, the electronics circuitry 9 illuminates the areas of touch interface 14 corresponding with the "1," "2," and "3" keys based on the pseudorandom generator and/or usage tracking. Upon detecting the user successively touching the "1," "2," and "3" keys (or the "3," "2", and "1" keys), the wear leveling is complete and the user can then enter a passcode to unlock the EL. Consider another example, shown in FIG. 8B, in which the electronics circuitry 9 illuminates the areas corresponding with the "1," "4," and "7" keys and the wear leveling is complete upon the user successively entering the "1," "4," and "7" keys (or the "7," "4," and "1" keys). Consider a further example, shown in FIG. 8C, in which the electronics circuitry illuminates the areas corresponding with the "2," "5," and "8" keys and the wear leveling is complete upon the user successively entering the "2," "5," and "8" keys (or the "8," "5," and "2" keys). Upon entering the sequence of illuminated areas, the electronics circuitry 9 could illuminate all areas of the touch interface 14 to indicate that the wear leveling action is complete.

Figure 7:
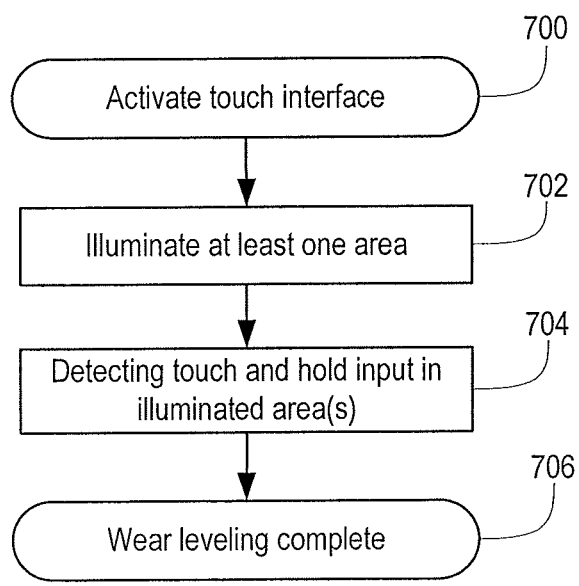
FIG. 7 is a flow chart showing an example method of using a wear leveling action according to an embodiment.

FIG. 7 shows steps of an example wear leveling action that could be performed by electronics circuitry 9 according to another embodiment of this disclosure. In this embodiment, upon activation of the touch interface (block 700), the electronics circuitry 9 illuminates at least one area of the touch interface 14 (block 702). The user must touch and hold the illuminated area(s) for a predetermined period of time for wear leveling to be complete. Upon detecting this touch and hold of the illuminated area(s) (block 704), the wear leveling action is complete (block 706).

Consider an example with this embodiment in which the user activates the touch interface 14 by pressing a button. In this example, the electronics circuitry 9 illuminates the area corresponding with "1." The user must touch and hold the area corresponding to the "1" key. After holding for a predetermined time period, the electronics circuitry 9 would illuminate all areas of the touch interface 14 to indicate that wear leveling is complete. Consider another example in which the electronics circuitry 9 illuminates multiple areas, such as the areas corresponding with the "2" and "3" keys. In this example, the user would touch and hold the areas of touch interface 14 corresponding with the "2" and "3" keys. Upon reaching the predetermined time period, the electronics circuitry 9 could illuminate all areas of the touch interface 14 to indicate that the wear leveling action is complete.

In another embodiment, upon activation of the touch interface 14, the electronics circuitry 9 illuminates all areas of the touch interface 14, except at least one key that will need to be touched as a wear leveling action. The user must touch the non-illuminated area(s) to complete the wear leveling action. Consider an example in which the electronics circuitry 9 illuminates all areas, except those corresponding to the 2 and 5 keys. When the user touches the 5 key, the electronics circuitry 9 would illuminate that area. The remaining area that is not illuminated would correspond to the 2 key in this example. Once the user touches the area corresponding to the 2 key, that area would illuminate and the wear leveling action would be complete.

In a further embodiment, one or more areas of the touch interface 14 could be blinking and must be touched for the wear leveling action. This could be done sequentially, which would start with one blinking area, which would lead to another blinking area after touching the first blinking area and so forth until the wear leveling action is complete. Alternatively, multiple blinking areas could be presented on the touch interface 14, which would each need to be touched to complete the wear leveling action. Consider an example in which the area corresponding to the 2 key is blinking. After the user touches this area, the area corresponding to the 5 key could start blinking. After the user touches the area corresponding to the 5 key, the electronics circuitry 9 could start blinking the area corresponding to the 9 key. After the user touches this area, the wear leveling action would be complete.

While this invention has been described with respect to an embodiment of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An electronic lock comprising:
 a latch assembly including a bolt movable between an extended position and a retracted position;
 a touch interface; and
 a circuit in electrical communication with the touch interface, wherein the circuit is configured to control movement of the bolt from the extended position to the retracted position responsive to a valid passcode being entered into the touch interface; and
 wherein the circuit is configured to require a wear leveling action that requires selection of one or more portions of the touch interface by a user prior to entering a passcode, wherein the selection requires a user to touch and hold the one or more portions of the touch interface for a predetermined period of time and the predetermined period of time is longer than a time period needed to enter a passcode on the touch interface.

2. The electronic lock as recited in claim 1, wherein the wear leveling action requires at least one input on the touch interface prior to entering a passcode.

3. The electronic lock as recited in claim 2, wherein the wear leveling action requires a plurality of inputs on the touch interface prior to entering a passcode.

4. The electronic lock as recited in claim 3, wherein the circuit is configured to provide a visual indication on the touch interface as to the portion of the touch interface to be selected to complete the wear leveling action.

5. The electronic lock as recited in claim 4, wherein the circuit is configured to illuminate one or more portions of the touch interface to be selected for the wear leveling action.

6. The electronic lock as recited in claim 5, wherein the wear leveling action is completed by selecting the illuminated portions of the touch interface.

7. The electronic lock as recited in claim 5, wherein the illuminated portions of the touch interface are generally coaxial.

8. The electronic lock as recited in claim 4, wherein the circuit is configured to sequentially provide a visual indication of the portions of the touch interface needed to complete the wear leveling action responsive to receiving input on the touch interface as to a portion of the wear leveling action.

9. The electronic lock as recited in claim 2, wherein the circuit is configured to track wear usage of the touch interface.

10. The electronic lock as recited in claim 9, wherein a portion of the touch interface to be selected to complete the wear leveling action is based at least in part on the wear usage of the touch interface by requiring one or more portions of the touch interface that are less heavily used to be selected during the wear leveling action.

11. The electronic lock as recited in claim 2, wherein a portion of the touch interface to be selected to complete the wear leveling action is based at least in part on a pseudorandom number generator.

12. The electronic lock as recited in claim 2, wherein the circuit is configured to visually and/or audibly indicate that the wear leveling action has been completed.

13. The electronic lock as recited in claim 12, wherein the circuit is configured to illuminate by blinking at least a portion of the touch interface to indicate the wear leveling action has been completed.

14. The electronic lock as recited in claim 1, wherein the touch interface comprises one of a touch keypad or a touch screen.

15. An electronic lock comprising:
a latch assembly including a bolt movable between an extended position and a retracted position;
a touch interface; and
a circuit in electrical communication with the touch interface, wherein the circuit is configured to control movement of the bolt from the extended position to the retracted position responsive to a valid passcode being entered into the touch interface;
wherein the circuit is configured to track wear usage of the touch interface;
wherein the circuit is configured to require a wear leveling action that requires selection of one or more portions of the touch interface prior to entering a passcode;
wherein the circuit is configured to determine the one or more portions of the touch interface to be selected to complete the wear leveling action based at least in part on the wear usage; and
wherein the circuit is configured to provide a visual indication on the touch interface as to the one or more portions of the touch interface to be selected by a user to complete the wear leveling action;
wherein the wear leveling action requires a selection of one or more portions of the touch interface for at least a predetermined period of time; and
wherein the predetermined period of time is longer than a time period needed to enter a passcode on the touch interface.

16. The electronic lock as recited in claim 15, wherein the circuit is configured to determine the one or more portions of the touch interface to be selected to complete the wear leveling action by selecting the less heavily used portions of the touch interface based on the wear usage.

17. The electronic lock as recited in claim 15, wherein the circuit is configured to determine the one or more portions of the touch interface to be selected to complete the wear leveling action based at least in part on a pseudorandom number generator.

18. The electronic lock as recited in claim 15, wherein the circuit is configured to provide a visual indication on the touch interface as to the portion of the touch interface to be selected to complete the wear leveling action.

19. The electronic lock as recited in claim 18, wherein the circuit is configured to illuminate the one or more portions of the touch interface to be selected to complete the wear leveling action.

20. The electronic lock as recited in claim 19, wherein the wear leveling action is completed by selecting the illuminated portions of the touch interface.

21. The electronic lock as recited in claim 20, wherein the illuminated portions of the touch interface are generally coaxial.

22. The electronic lock as recited in claim 15, wherein the circuit is configured to sequentially illuminate the portions of the touch interface needed to complete the wear leveling action responsive to receiving input on the touch interface as to a portion of the wear leveling action.

23. A method of leveling wear on a touch surface for an electronic lock, the method comprising the steps of:
determining one or more portions of a touch interface of an electronic lock that need to be selected to complete a wear leveling action;
visually indicating on the touch interface the one or more portions of the touch interface that need to be selected to complete the wear leveling action; and
indicating visually and/or audibly that the wear leveling action has been completed upon selection of the one or more portions of the touch interface needed to be selected to complete the wear leveling action, wherein the selection requires a user to touch and hold the one or more portions of the touch interface for a predetermined period of time and the predetermined period of time is longer than a time period needed to enter a passcode on the touch interface.

24. The method as recited in claim 23, wherein the determination of the one or more portions of a touch interface that need to be selected to complete the wear leveling action is made, at least in part, using a pseudorandom number generator.

25. The method as recited in claim 23, further comprising the step of tracking wear usage of the touch interface.

26. The method as recited in claim 25, wherein the determination of the one or more portions of a touch interface that need to be selected to complete the wear leveling action is made, at least in part, using the wear usage of the touch interface.

27. The method as recited in claim 23, wherein the visual indication of the one or more portions of the touch interface that need to be selected to complete the wear leveling action is made by illuminating these portions of the touch interface needed.

28. The method as recited in claim 23, wherein the visual indication of the one or more portions of the touch interface that need to be selected to complete the wear leveling action is made by sequentially illuminating the one or more portions of the touch interface needed to be selected to complete the wear leveling action responsive to receiving selections on the touch interface of the portions needed be selected for the wear leveling action.

* * * * *